May 25, 1971  T. J. L. CLARKE ET AL  3,580,774

METHOD FOR COATING WORK PIECES WITH THERMOPLASTIC MATERIAL

Filed Sept. 6, 1967  2 Sheets-Sheet 1

*Inventors*
Terence J.L. Clarke
Ivor Evans, Dec'd.
Josie V. Evans, Admx.
By their Attorney

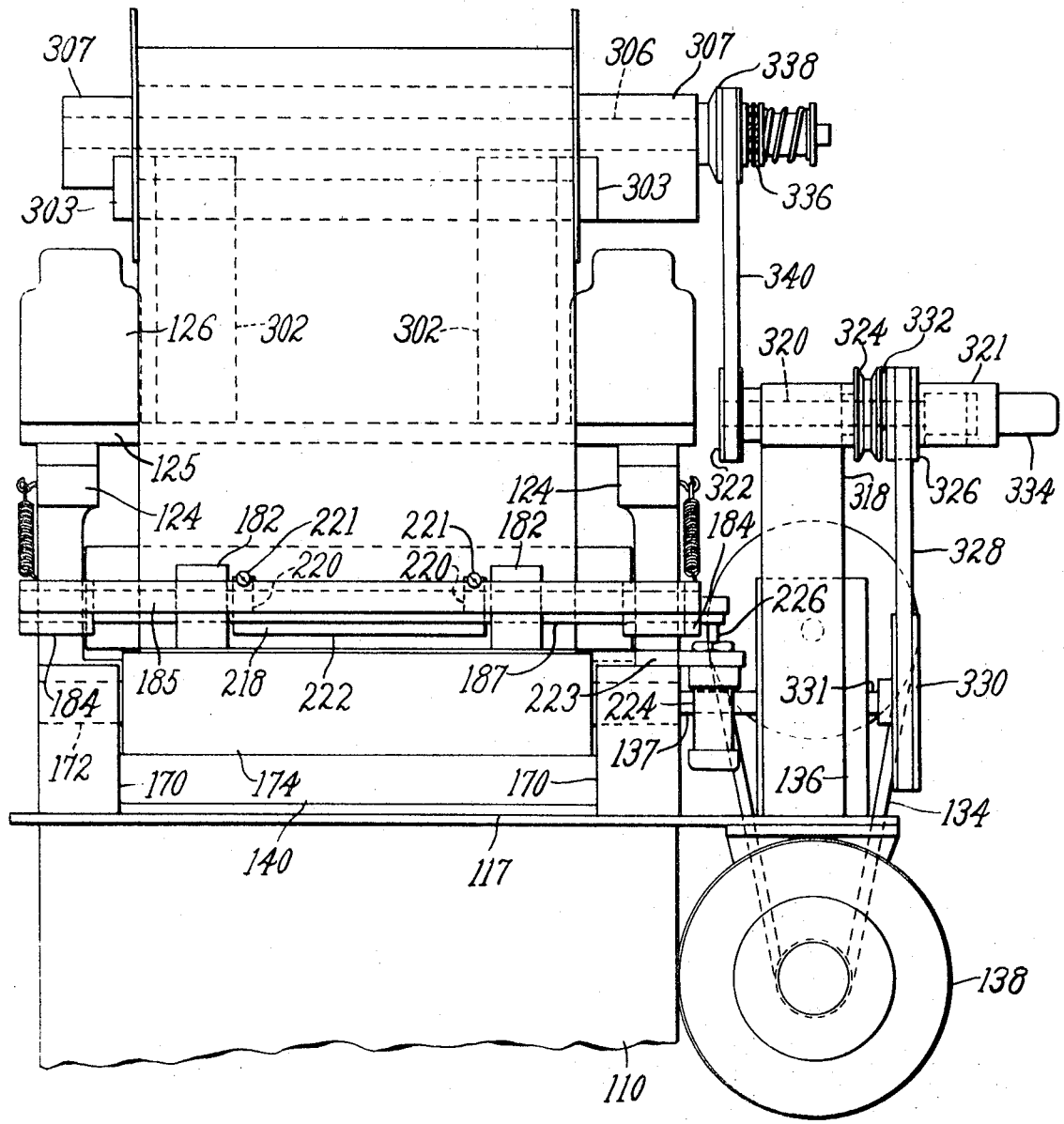

3,580,774
METHOD FOR COATING WORK PIECES WITH THERMOPLASTIC MATERIAL

Terence J. L. Clarke, Leicester, England, Ivor Evans, deceased, late of Leicester, England, by Josie V. Evans, administratrix, Cossington, England, assignors to United Shoe Machinery Corporation, Flemington, N.J.
Filed Sept. 6, 1967, Ser. No. 667,323
Claims priority, application Great Britain, Sept. 9, 1966, 40,366/66; Dec. 9, 1966, 55,212/66; Feb. 14, 1967, 6,894/67
Int. Cl. B23b 31/12
U.S. Cl. 156—247                3 Claims

ABSTRACT OF THE DISCLOSURE

A method of coating sheet material work pieces with thermoplastic adhesive material is provided by the present invention. According to the method, work pieces are assembled between a layer of thermoplastic adhesive material and a layer of stripper material suitably newsprint, and the assembly is subjected to heat and pressure. The coated work pieces and the stripper layer are separated while the thermoplastic adhesive is in heat softened condition, the stripper material retaining surplus adhesive material. Suitably, the layer of thermoplastic adhesive mtaerial is a film, preferably supported on a layer of release material, suitably silicone paper, which enhances the cleanliness of the pressing operation and which upon separation serves to retain the work pieces while surplus thermoplastic adhesive material is removed on the stripper layer.

BACKGROUND OF THE INVENTION

Figure 1:
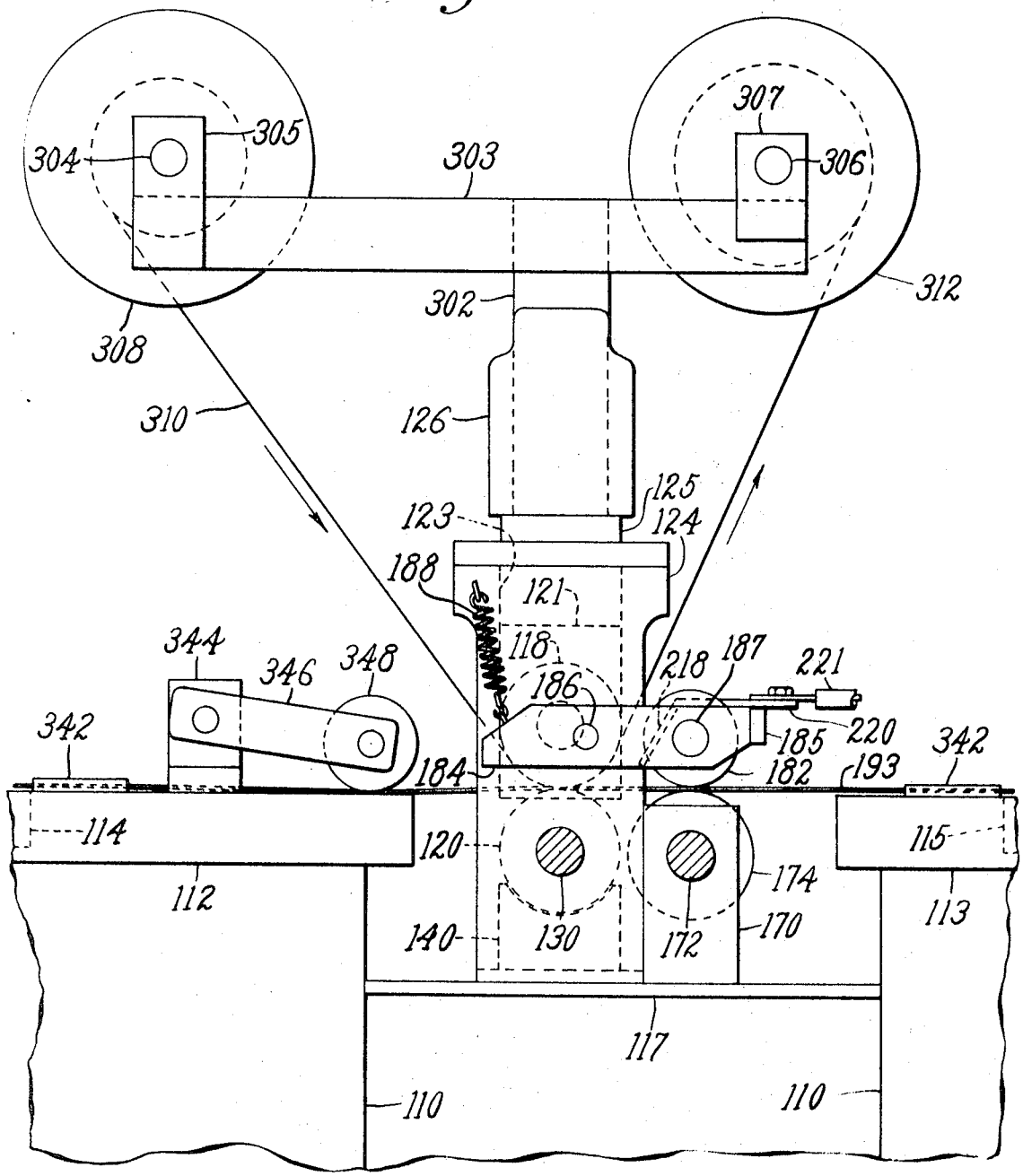

This invention relates to the adhesive bonding of parts and more particularly is concerned with improvements in or relating to methods of coating work pieces with adhesive material and apparatus for use therein. The invention is illustrated as applied to the bonding of pieces of sheet material in the assembly of parts of shoe uppers. The word "shoe" is used herein generically to indicate outer footwear generally.

In the manufacture of shoes of a type which do not wholly enclose the foot of a wearer but leave the heel exposed and the forepart partly visible through openings in the vamp, that is to say of a type of which sandals and sling-back shoes are examples, it is customary to cut out for each shoe a number of pieces of leather or other material suitable for the outer integument of the shoe upper, the shapes varying in outline, some of them being elongated and strap-like, cutting similarly shaped pieces from thin leather or other suitable lining material, coating one or both sets of pieces with a liquid adhesive composition, for example a neoprene rubber solution, and allowing the coatings to dry, and reactivating the coatings by heat, for example, generated by a high-frequency electric field, and bonding the pieces together.

The application of liquid adhesive compositions to pieces of a shoe upper, especially where the pieces, as is usually the case with the pieces of lining material in carrying out a procedure as just referred to, are narrow and flimsy, tends to be laborious and messy.

SUMMARY OF THE INVENTION

It is one of the objects of the present invention to provide an improved method of coating sheet material work pieces with adhesive material which method will overcome the aforesaid difficulties.

To this end and in accordance with a feature of the present invention there is provided a method of applying adhesive material to such pieces in which the material is employed as a non-tacky layer of a heat-softenable adhesive composition, and is heated and pressed against the work pieces backed by a layer of stripper material. According to the method of the present invention, work pieces are assembled with a layer of such thermoplastic material, suitably in the form of powder or a supported or unsupported film, and a stripper layer, suitably of cheap paper with the work pieces disposed between the layers and the assembly subjected to heat and pressure. The pressure operates to bond the adhesive layer firmly to the work pieces and to the layer of stripper material including areas adjacent the peripheries of the work pieces to define a clean margin when the work pieces are thereafter removed from the stripper layer while the thermoplastic adhesive material is in a heat-softened condition leaving the surplus adhesive on the stripper layer.

In a preferred mode of practicing the method of the present invention the work pieces are disposed between a layer of the adhesive composition supported by a backing material from which the composition can readily be removed, suitably silicone release paper, and a layer of stripper material to which the adhesive composition will adhere more strongly than to the backing material. Thereafter the layers are subjected to heat and pressure and the work pieces are separated from surplus adhesive material by separating the stripper material and the backing material while the adhesive composition is in heat-softened condition, the stripper material carrying with it the adhesive composition engaged thereby and leaving behind the work pieces on the backing material.

Another object of the invention is the provision of apparatus adapted for use in carrying out the foregoing method.

To this end and in accordance with a feature of the present invention, there is provided apparatus comprising a table for supporting a layer of sheet material carrying work pieces in engagement with a layer of theromplastic adhesive material. At least a portion of the table suitably is arranged to be heated for warming the layer of thermoplastic adhesive supported thereon to effect light adherence of the work pieces engaged therewith. The apparatus includes upper and lower presser rolls operable to heat and press an assembly comprising the work pieces disposed between a layer of stripper material and a layer of said thermoplastic material, the lower roll being provided with heating means for softening the adhesive material. The upper roll is deformable for pressing the upper layer firmly against the lower layer at the peripheries of the work pieces. Preferably, the apparatus includes tensioning means for backing material fed through the presser rollers and means for supporting dispensing and take-up reels for handling stripper material used for removing surplus adhesive.

The invention will be described further in connection with the attached drawings in which:

FIG. 1 is a front elevation partly in section of apparatus embodying the present invention; and FIG. 2 is a right elevation on a slightly enlarged scale and with a table removed of the apparatus shown in FIG. 1.

DESCRIPTION OF THE PREFERRED EMBODIMENTS

In carrying out the method of the present invention, work pieces are assembled with a layer of stripper material and a layer of adhesive material which is non-tacky at room temperature but which becomes tacky and then activated upon the application of heat. In the preferred mode in carrying out the method, an adhesive film suitably about .002″ to .004″ thick is carried as a coating on a layer of backing material, suitably silicone release paper. However, the adhesive may be provided in the form of an unsupported film or a layer of powdered adhesive. Where the method is practised without the use of a layer of backing material, a layer of stripper material such as cheap newsprint is fed across a warm table carrying work pieces thereon while a layer of adhesive is disposed over the work pieces and the stripper material. The assembly is then subjected to heat and pressure for activation and bonding of the adhesive layer to the work pieces and stripper material. The bonded assembly may be stored for future use or, if the work pieces are then to be bonded to other parts, the work pieces may be removed from the stripper material while the adhesive is in heat-softened condition. Because of the strong attachment of the adhesive to the stripper material, and the application of pressure, the work pieces when picked off, have an adhesive coating thereon with clearly defined margins.

In a preferred embodiment of the present invention the adhesive is supported against the work pieces and stripper material by a layer of backing material, suitably silicone release paper to which the adhesive adheres less strongly than to the stripper material. In this mode of carrying out the method, a layer of backing material carrying as a coating thereon a layer of adhesive is drawn across a warm table with the work pieces superimposed thereon. A layer of stripper material is disposed over the work pieces and adhesive layer and the assembly heated and pressed. The layer of stripper material is separated from the backing material while the adhesive is in heat-softened condition, leaving the coated work pieces on the backing material and removing the surplus adhesive on the stripper material.

It is also within the purview of the invention to provide a method in which the work pieces are carried on a layer of stripper material while a layer of thermoplastic adhesive material is applied to the exposed surfaces of the work pieces and stripper material and in which a layer of backing material, suitably silicone release paper, is employed for supporting the layer of adhesive against the work pieces and stripper material during the application of heat and pressure and thereafter serves to retain thereon the coated work pieces while the stripper material is removed with excess adhesive.

Referring now to the drawings, apparatus suitable to carrying out the invention in the preferred mode as well as in other modes thereof comprises a frame 110 arranged to stand on the floor. The frame provides left hand and right hand horizontal tables 112, 113 respectively with a platform 117 of the frame 110 therebetween. Heated blocks 114, 115 are inset in the tables 112, 113 respectively.

Similarly secured to the platform 117 of the illustrative apparatus and connected by a horizontal plate 125 are housings 124 by which are carried upper and lower presser rolls 118 and 120 respectively. The upper roll 118 has a surface layer of silicon rubber and is free to rotate in bearings mounted in blocks 121 (only one visible in the drawings), the blocks 121 being mounted for up and down movement in guideways 123 (only one visible in the drawings) in the housing 124. The blocks 121 can be moved downwards by air under pressure admitted to spring return air motors 126 mounted on the plate 125 upon depression of a foot pedal (not shown).

The lower presser roll 120 of the illustrative apparatus is a smooth steel one mounted in the housings 124 vertically below the roll 118 on the shaft 130 at such a height that the highest point of the roll is level with and close to the surface of the left hand table 112. The roll 120 is arranged to be heated by a block 140 having a semi-cylindrical upper surface and heated in turn by electrical elements not shown.

Mounted on the platform 117 is a speed reduction unit 136 driven by a belt 134 from an electric motor 138 secured to the underside of the platform 117. An output shaft 137 of the speed reduction unit 136 is coupled to the shaft 130.

Also secured to the platform 117 are blocks 170 by which is supported for rotation a shaft 172 parallel to the shaft 130. A smooth steel roller 174 is secured to the shaft 172, the shaft being at such a height that the highest point of the roller is level with and close to the surface of the right hand table 113. The shaft 172 is arranged to be driven by gears (not shown) from the shaft 130 at the same number of revolutions per minute as the shaft 130; however the diameter of the roller 174 is slightly greater than that of the roll 120.

Two arms 184 are pivotally mounted on bearing pins 186 and are rigidly connected by a bar 185. An axle 187 is rotatably mounted in bearings (not shown) carried in the arms 184 and is parallel to the roller 174. Secured to the axle 187 and spaced apart therealong (see FIG. 2) are two rollers 182 of neoprene rubber. The rollers 182 are urged toward the roller 174 by springs 188 extending between the arms 184 and the housings 124.

A scraper bar 218 is carried by brackets 220 secured to the bar 185 and lies between the two rollers 182 and a scraper edge 222 of the scraper bar 218 lies between the rollers 118 and 182. The brackets 220 are electrically insulated from the bar 185 and the brackets are connected by wires 221 to an electrical supply. In the operation of the illustrative apparatus an electrical current (for example 100 amps at 2 volts) is passed through the brackets 220 along the scraper bar 218 whereby to heat the bar to an elevated temperature of, for example, 130° C. Secured to a plate 223 secured to the blocks 170 at the rear of the illustrative apparatus is a small spring return air motor 224 having a plunger 226 arranged, when air is supplied to the motor 224, to bear on one of the arms 184 to hold the arms 184 in a raised position with the rollers 182 out of contact with the roller 174.

The rollers 174 and 182 are tensioning rollers of the illustrative apparatus.

Supports (not shown) for a dispenser reel (not shown) carrying adhesive-coated release paper 193 and supports (not shown) for a take-up reel (not shown) are mounted on the frame 110 and the take-up reel is arranged to be driven, in the operation of the illustrative apparatus, through a slipping clutch from an electric motor (not shown) mounted on the frame 110 beneath the table 113, the dispenser reel being braked sufficiently to keep the release paper taut in the operation of the illustrative apparatus.

Secured to the plate 125 are two support pillars 302 each carrying a bar 303, the bars 303 being parallel to each other. Shafts 304, 306 are rotatably mounted in bosses 305, 307 respectively carried by the bars 303. A dispenser reel 308 for newsprint 310 is secured to the rod 304 for rotation therewith and the rod is arranged to be braked, in the operation of the illustrative apparatus, by braking means (not shown). A take-up reel 312 for the newsprint is secured to the shaft 306 for rotation therewith. The reels 308 and 312 are removable from the shafts 304, 306 so that they may be readily replaced by other reels.

Secured to the platform 117 is a post 318 (FIG. 2) at an upper end of which a shaft 320 is rotatably mounted in bearings (not shown) one set in the post and another set carried at a right hand end (viewing FIG. 2) of an arm 321. Keyed to the shaft 320 at a left hand end thereof (viewing FIG. 2) is a pulley 322 and keyed to the shaft 320 to the right of the post 318 is another pulley 324. A pulley 326 is freely rotatable on the shaft 320 and is carried thereon to the right of the pulley 324. The pulley 326 is driven, in the operation of the illustrative apparatus, by a belt 328 passing round a pulley 330 secured to an output shaft 331 of the speed reduction unit 136. A friction clutch lining 332 is bonded to a face of the pulley 326 adjacent the pulley 324. Mounted at the right hand end of the arm 321 is a spring-return air motor 334 which on supply of air under pressure in the operation of the illustrative apparatus moves the pulley 326 to the left (viewing FIG. 2) and thus the lining 332 into engagement with the pulley 324 whereby to drive the pulley 324 and thus the shaft 320 from the pulley 326.

A slipping clutch unit 336 is supported on the shaft 306 which is driven through the clutch unit 336 by a pulley 338 driven by a belt 340 which passes round the pulley 322.

Identical guides 342 for the release paper 193 are secured to the tables 112, 113 adjacent the platform 117.

Two brackets 344 (only one visible in the drawings) are secured to the table 112 between the guide 342 and the platform 117. Arms 346 are pivotally mounted on the brackets 344 (one on each bracket) and support, for free rotation about an axis parallel to the axis of the roll 120, a roller 348 having a silicone rubber surface. The roller 348 is arranged to lie under its own weight on the adhesive coated release paper 193 to assist in preventing the paper 193 creasing between the edge of the table 112 and rolls 118, 120.

In will be understood that means may be provided in the illustrative apparatus for varying the temperature of the heated blocks 114, 115 in the tables 112, 113, the block 140 and the scraper bar 218, and means is provided for varying the speed of rotation of the roll 120 and the roller 174. Means may also be provided for varying the pressure exerted by the roll 118.

Conveniently in the operation of the illustrative apparatus, in applying a layer of a heat-softenable adhesive composition to a piece of sheet material, the release paper 193 used comprises a paper base sheet treated with a silicone release agent. The release paper is coated on one side with a layer of uniform 0.002" thickness of an adhesive based on ethylene vinyl acetate copolymer. The adhesive layer is applied to a central portion of the paper leaving marginal portions of the paper uncoated; the rollers 182 are arranged to run on these marginal portions.

In setting up the illustrative apparatus a reel of this adhesive-coated release paper 193 is first mounted on the support for the dispenser reel and the paper is led over an idler roller (not shown) across the table 112 (including the heated block 114 thereof) and through the first of the guides 342, between the roller 348 and the table 112, between the rolls 118 and 120 and then the rollers 174 and 182, through the second of the guides 342 and thence over the table 113 (including the heated block 115 thereof) over another idler roller (not shown) onto a take-up reel (not shown). The dispenser reel 308 (carrying newsprint 310) is mounted on the shaft 304 and newsprint 310 is led from the reel 308 round the roller 118 to the take-up reel 312 mounted on the shaft 306. The block 140 and the heated blocks 114, 115 in the tables 112, 113 are heated to desired temperatures. Suitably for example, the block 114 may be heated to about 70° C. while the roll 120 and block 140 are heated to about 140° C. Work pieces of lining material are then placed on the adhesive coated paper 193 in spaced array, overlying the block 114.

When the surface of the paper immediately in front of the operator is sufficiently covered, the operator presses the foot pedal actuating a valve (not shown), actuation of which admits air to the air motors 126 causing the upper roll 118 to descend so that it spreads into contact with the work, the work being thus pressed between the upper roll 118 and the lower roll 120 (the lower roll 120 rotates continuously when power is supplied to the illustrative apparatus). The adhesive-coated release paper 193 with the lining material thereon and the newsprint 210 are thus fed between the rolls 118 and 120 by rotation of the roll 120. Actuation of the valve by the foot pedal also causes air to be actuated to the air motor 334 thus to drive the pulley 322 and drive through the clutch unit 336 the take-up reel 312. Actuation of the valve by the foot pedal also releases air from the air motor 224 and allows the arms 184 to be urged downwardly by the springs 188 so that the rollers 182 contact the marginal portions of the release paper 193 and press them against the roller 174 (which is driven from the roll 120), the tensioning rollers 174, 182 drawing the paper 193 (carrying the pieces of lining material) onwards in a straight line, the newsprint 210 carrying excess adhesive being drawn up onto the take-up reel 312. The scraper bar 218 acts to break any strings of adhesive stretching between the newsprint 210 and release paper 193 as they are separated. A pressure switch is also operated on actuation of the valve, the pressure switch closing a circuit to start the electric motor mounted beneath the table 113 to drive, through the slipping clutch, the take-up reel for the release paper 193.

When the pieces of lining material are removed from the release paper they are found to have a uniform coating of adhesive on one side thereof.

Having thus described our invention, what we claim as new and desire to secure by Letters Patent of the United States is:

1. The method of coating work pieces of sheet material with thermoplastic adhesive material which method comprises the steps of assembling a layer of stripper material, said work pieces, and a layer of thermoplastic adhesive material with said work pieces between said layers, heating the assembly to soften the thermoplastic adhesive material, pressing the assembly to engage the thermoplastic adhesive material with the work pieces and with the stripper material in at least areas adjacent the peripheries of the work pieces, and separating the work pieces and the stripper material while the thermoplastic material is in heat-softened condition, the stripper material being so adherent to the heat-softened thermoplastic adhesive material as to retain the layer thereof in areas of engagement therewith.

2. The method as defined in claim 1 in which the layer of thermoplastic adhesive material is initially in the form of a film.

3. The method as defined in claim 1 in which the layer of thermoplastic adhesive material is initially in the form of a film coated on a layer of release material to which the thermoplastic adhesive material in heat-softened condition adheres less strongly than to the stripper material and in which separation of the work pieces and the stripper material is effected by separating the layer of release material and the layer of stripper material, the work pieces being retained on the layer of release material.

References Cited

UNITED STATES PATENTS

| 2,599,359 | 6/1952 | Banks et al. | 161—406X |
| 2,653,885 | 9/1953 | Harper | 161—406X |
| 2,704,735 | 3/1955 | Hedges et al. | 117—6X |
| 2,801,949 | 8/1957 | Bateman | 161—406X |

FOREIGN PATENTS

| 5,744 | 6/1962 | Japan | 156—247 |

LELAND A. SEBASTIAN, Primary Examiner

U.S. Cl. X.R.

117—6; 156—283, 289, 306; 161—406